INVENTORS
ALEXANDER BOGOT
JOSEPH F. MULLEN
BY Robert L. Olson
ATTORNEY

May 24, 1966 A. BOGOT ETAL 3,252,435
CONVEYING, DRYING AND INCINERATING APPARATUS FOR BARK
Filed Dec. 27, 1963 2 Sheets-Sheet 2
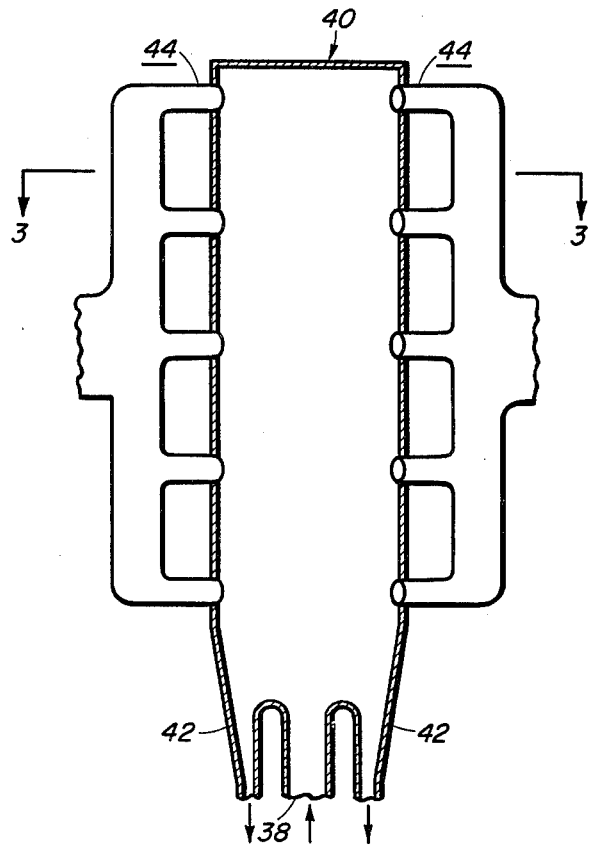
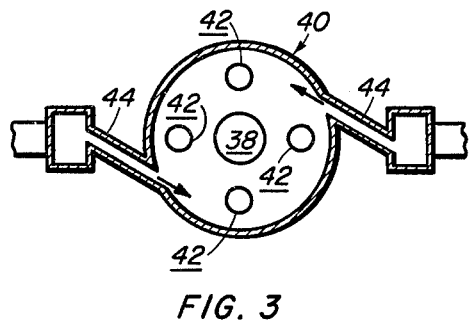
INVENTORS
ALEXANDER BOGOT
BY JOSEPH F. MULLEN
Robert L. Olson
ATTORNEY

United States Patent Office 3,252,435
Patented May 24, 1966

3,252,435
CONVEYING, DRYING AND INCINERATING
APPARATUS FOR BARK
Alexander Bogot and Joseph F. Mullen, both of West
Hartford, Conn., assignors to Combustion Engineering, Inc., Windsor, Conn., a corporation of Delaware
Filed Dec. 27, 1963, Ser. No. 333,909
4 Claims. (Cl. 110—7)

This invention relates to conveying and drying apparatus and, in particular, to such apparatus for handling wet waste fuels, such as bark.

At pulp paper plants, a considerable amount of bark is removed from the logs. One manner of disposing of this large amount of bark is to burn it, utilizing the heat to generate steam. The bark generally contains a high moisture content (50–70% by weight). Because of this, and the additional fact that the bark is of a bulky nature, difficulties are encountered in economically transporting the wet bark from the log barking area of the plant site to the furnace of the steam generator, and drying it sufficiently so that it will be combustible. Most plants incorporate quite a complex and costly conveying and drying arrangement to handle the bark.

It is an object of this invention to provide conveying and drying apparatus for wet bark that is simple and economical to construct and operate.

Other objects and advantages of the invention will become apparent from the following description, taken in conjunction with the accompanying drawings wherein:

FIG. 2 is an enlarged cross-sectional side view of the drying column of FIGURE 1; and, FIGURE 3 is a cross-sectional plan view of the drying column taken on line 3—3 of FIGURE 2.

Figure 1:
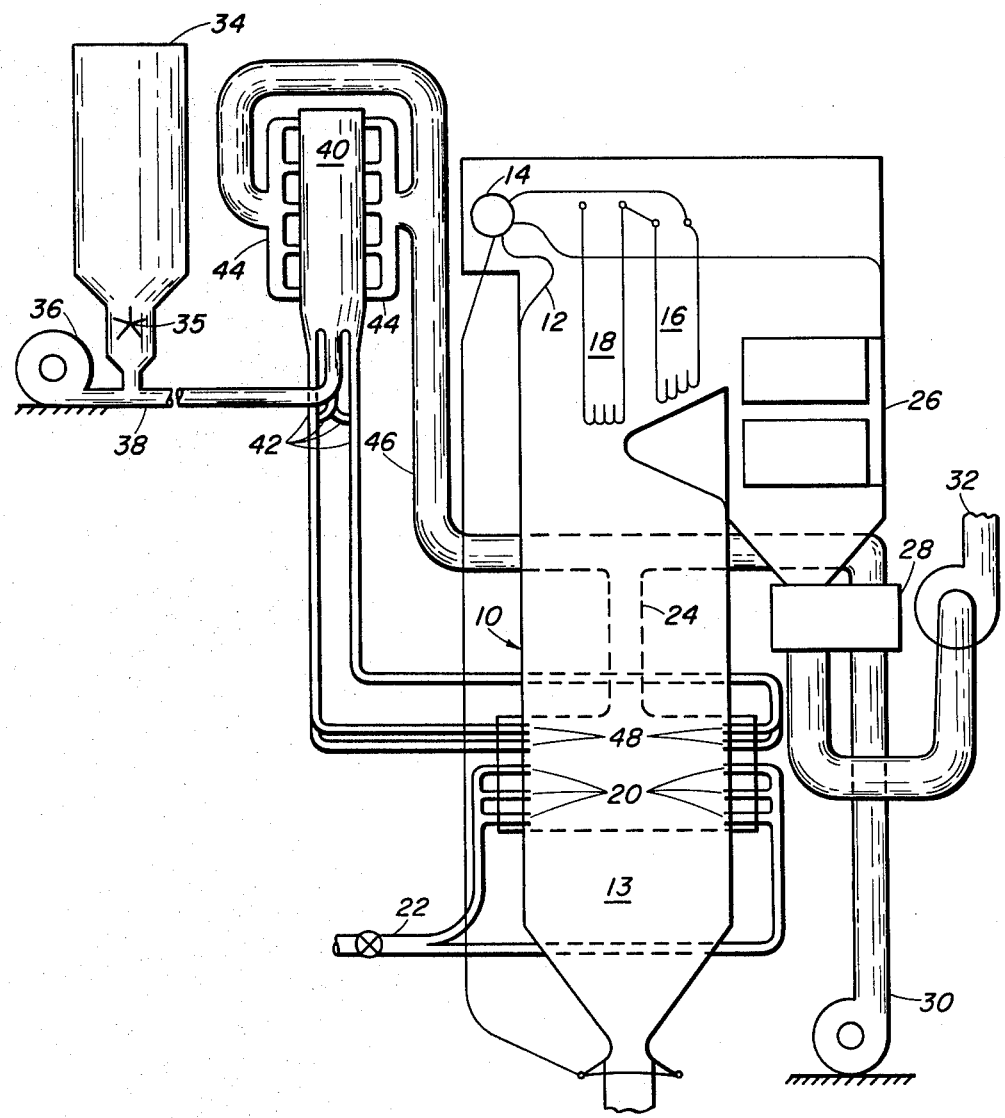
FIGURE 1 is a diagrammatic arrangement of a steam generator, incorporating our novel fuel drying and conveying apparatus.

Looking now to FIGURE 1 of the drawings, numeral 10 designates a steam generator. Steam generating tubes 12 line the walls of the furnace 13, and discharge steam and water to drum 14. Steam leaves drum 14 and passes through superheaters 16 and 18 before flowing on to its ultimate point of use.

Fuel is supplied to the furnace 13 by a plurality of burners 20. The fuel, which can be oil, gas, or pulverized coal, is delivered to the burners by pipe 22. Branch duct 24 supplies the air necessary to support combustion of the fuel to the windboxes surrounding the burners.

The hot combustion gases created in the furnace, pass through rear gas pass 26, then through a rotary regenerative air heater 28, and are exhausted to atmosphere by way of stack 32. Air is supplied to the air heater by forced draft fan 30.

Moisture laden bark is fed from storage bin 34 through rotary air lock 35 into pipe 38. Rotary air lock 35 prevents any air from escaping from pipe 38, while permitting passage of the bark therethrough. Air is supplied to the pipe 38 by fan 36. The bark storage bin 34 is located adjacent the log barking equipment, which might be a substantial distance from the steam generator. Sufficient air is supplied by fan 36 so that it acts as the conveying medium for transporting the bark from bin 34 to drying tower 40, which is located adjacent the steam generator 10.

Pipe 38 is connected to the central bottom portion of drying column 40. Drying air is supplied to the drying column through branch duct 46, and is introduced tangentially thereinto through nozzles 44. The dried bark and moisture laden air leave the drying column 40 through four outlet pipes 42, which extend from the drying column to the furnace 13. The bark and air are introduced into furnace 13 through burners 48. A sufficient amount of air flows along with the bark from the drying column so that it can support combustion of subtsantially all of the bark. If a small amount of additional air is needed, it is supplied through the windboxes surrounding the burners 20.

FIGURES 2 and 3 show the details of construction of the drying column 40. As can be seen, the conveying air and moisture laden bark are introduced into column 40 through pipe 38. The bark should be moving at a relatively high velocity when entering the column. This high velocity enables the heavier particles of bark to be thrown high up into the uppermost region of the column, thus increasing the retention time. Nozzles 44 introduce the hot air tangentially into the column, causing a cyclonic action therein. This also increases the retention time of the particles within the column, and thus a considerable amount of moisture can be evaporated from the bark.

The drying column is located adjacent the upper portion of the steam generator, so that the force of gravity carries the relatively dry bark particles through pipes 42 to the burners 48. The now moisture laden air also flows through these pipes 42, and furnishes the air necessary to support combustion of the bark.

The nozzles 44 introduce the drying air into column 40 throughout a substantial portion of its height. Thus an effective cyclonic action is created throughout the entire length. This extends the retention period of even the lighter bark particles, which do not have the inertia or momentum to be projected upwardly into the column to any great extent.

The furnace 13 may be of the pressurized type, where the pressure therein is maintained above atmospheric pressure. This is one of the reasons why air lock 35 is used for introducing the wet bark from storage bin 34 into pipe 38. The drying air entering the column 40 should be at a high temperature, so that the moisture content of the bark leaving the column is low. With low moisture content, the bark can be readily ignited and burned in the furnace.

While we have shown and described the preferred embodiment of the invention, it is to be understood that the invention is not limited thereto, but may be otherwise variously embodied and practiced within the scope of the following claims.

What we claim is:

1. In combination, an upright drying column, said drying column containing side wall means, bottom wall means, and an imperforate top wall means, a first source of high pressure gas, a first pipe having an inlet connected to the first source of high pressure gas, and an outlet connected to the central portion of the bottom wall means of the drying column, means for introducing wet, solid fuel to the first pipe intermediate its ends, the velocity of the gas flowing through the first pipe being sufficient to convey the wet solid fuel to said drying column, and force such wet solid fuel upwardly into the interior of the drying column, a second source of hot gas, a second pipe having an inlet connected to the second source, and an outlet tangentially connected to the drying column so as to introduce the hot gas tangentially into the drying column, the hot gas entering the drying column thus coming into contact with the wet solid fuel, causing it to spin within the drying column, and said hot gas removing moisture from the wet solid fuel, a furnace, a third pipe having an inlet connected to the bottom wall means of said drying column, and an outlet connected to the furnace, the bottom wall means of the drying column being constructed such that it slopes downwardly from the side wall means towards the inlet of the third pipe, so that the relatively dry solid fuel and the vapor laden gas flows from said drying column to the furnace, where the solid fuel is burned.

2. In combination, an upright cylindrical drying column, said drying column containing side wall means, bottom wall means, and an imperforate top wall means, a first source of high pressure air, a first pipe having an inlet connected to the first source, and an outlet connected to the central portion of the bottom wall means of the drying column, means for introducing wet, solid fuel particles to the first pipe intermediate its ends, the velocity of the air flowing through the first pipe being sufficient to convey the wet solid fuel particles to said drying column, and force such wet fuel particles upwardly into the interior of the drying column, a second source of high pressure hot air, a second pipe having an inlet connected to the second source, and an outlet tangentially connected to the drying column so as to introduce the hot air tangentially into the drying column, the hot air thus coming into contact with the wet solid fuel particles, causing them to spin within the drying column, and removing moisture therefrom, a furnace, a third pipe having an inlet connected to the bottom wall means of said drying column, and an outlet connected to the furnace, the bottom wall means of the furnace being constructed such that it slopes downwardly from the side wall means towards the inlet of the third pipe, so that the relatively dry solid fuel particles and the vapor laden air flows from the drying column to the furnace, the vapor laden air being utilized to support a substantial portion of the combustion of the solid fuel particles within the furnace.

3. The combination set forth in claim 2, whereby the outlet of said second pipe is connected to the drying column in such a manner so as to introduce the hot air tangentially into the drying column throughout a substantial portion of its height.

4. In combination, an upright cylindrical drying column, said drying column containing side wall means, bottom wall means, and an imperforate top wall means, a first source of high pressure air, a first pipe having an inlet connected to the first source, and an outlet connected to the central portion of the bottom wall means of the drying column, a rotary airlock for introducing wet, solid fuel particles to the first pipe intermediate its ends, said rotary airlock permitting the solid fuel particles to enter the first pipe, but preventing air from leaving therethrough, the velocity of the air flowing through the first pipe being sufficient to convey the wet solid fuel particles to said drying column, and force such wet fuel particles upwardly into the interior of the drying column, a second source of high pressure air, a second pipe having an inlet connected to the second source, and an outlet tangentially connected to the drying column so as to introduce the air tangentially into the drying column, the air thus coming into contact with the wet solid fuel particles causing them to spin within the drying column, a pressurized furnace, a third pipe having an inlet connected to the furnace and an outlet opening to the atmosphere, through which hot combustion gases from the furnace pass, heat exchange means positioned such that the hot combustion gases in the third pipe pass in heat exchange relationship with the air flowing through the second pipe, a fourth pipe having an inlet connected to the bottom wall means of said drying column, and an outlet connected to the furnace, the bottom wall means of the drying column being constructed such that it slopes downwardly from the side wall means towards the inlet of the fourth pipe, so that the relatively dry solid fuel particles and the vapor laden air flows from the drying column to the furnace, the vapor laden air being utilized to support a substantial portion of the combustion of the solid fuel particles within the furnace.

References Cited by the Examiner
UNITED STATES PATENTS

| | | |
|---|---|---|
| 2,054,441 | 9/1936 | Peebles. |
| 2,271,157 | 1/1942 | Badenhauser _____ 110—7 |
| 2,435,927 | 2/1948 | Manning et al. _____ 35—57 X |
| 3,064,592 | 11/1962 | Eberhardt _____ 110—102 X |

FREDERICK L. MATTESON, JR., *Primary Examiner.*

JOHN J. CAMBY, *Examiner.*